J. R. WHITE.
FRICTION DRIVING MECHANISM.
APPLICATION FILED MAR. 21, 1921.
1,406,792.
Patented Feb. 14, 1922.
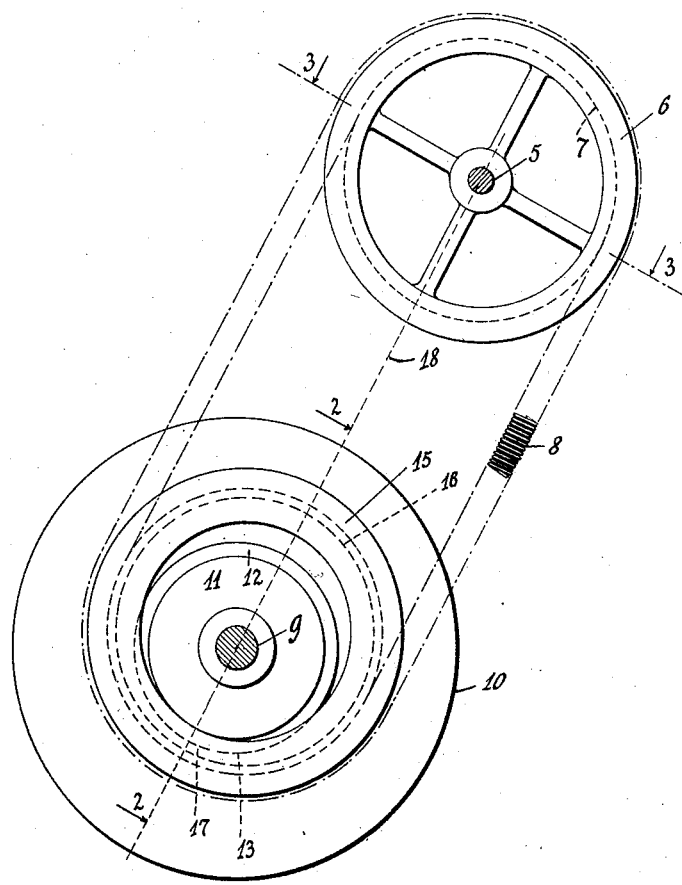
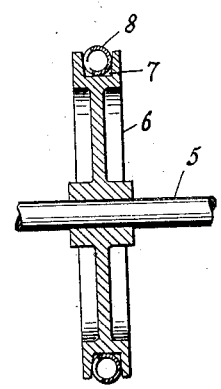
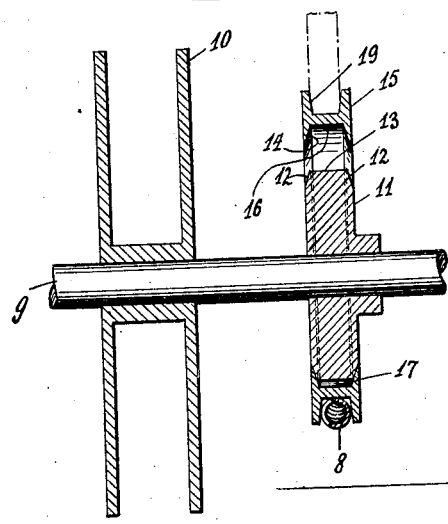
INVENTOR.
Joseph R. White
BY
ATTORNEYS

UNITED STATES PATENT OFFICE.

JOSEPH ROGER WHITE, OF EAST ORANGE, NEW JERSEY, ASSIGNOR TO GRAPHOSCOPE DEVELOPMENT COMPANY, OF NEW YORK, N. Y., A CORPORATION OF DELAWARE.

FRICTION DRIVING MECHANISM.

1,406,792. Specification of Letters Patent. Patented Feb. 14, 1922.

Application filed March 21, 1921. Serial No. 453,937.

*To all whom it may concern:*

Be it known that I, JOSEPH ROGER WHITE, a citizen of the United States, residing at East Orange, county of Essex, and State of New Jersey, have invented certain new and useful Improvements in Friction Driving Mechanism, of which the following is a specification.

My invention relates to friction drives and is particularly intended for the film spools of moving pictures machines, but may be employed in other cases where a driving member operated at a practically constant speed co-operates with a driven member the speed of which is required to vary.

A typical example of my invention will now be described with reference to the accompanying drawings, in which Fig. 1 is a side elevation of my improved drive, and Figs. 2 and 3, are partial cross sections thereof, on lines 2—2 and 3—3 respectively, of Fig. 1.

At 5 I have indicated the horizontal drive shaft or power shaft, operated in any suitable manner and journaled in stationary bearings (not shown). On this shaft is secured rigidly, or at least so as to rotate in unison therewith, a driving wheel 6, here shown as having an annular exterior groove 7 of trapezoidal cross section. This groove receives a transmission member or driving belt 8, preferably longitudinally elastic, for instance a belt made of a coiled wire, as shown.

At a distance from the shaft 5, and parallel thereto, is arranged the driven shaft 9, journaled in stationary bearings (not shown) and held to rotate in unison with the film spool or reel, or other driven member, indicated at 10. With this driven shaft 9 is also held to turn a rolling friction disk or wheel 11, having two annular cone contact surfaces 12 which diverge toward the axis of the shaft 9, while between these surfaces 12 is located a free surface 13, here shown cylindrical.

The external contact surfaces 12 are adapted for rolling contact with similar internal-cone surfaces 14 on the driving friction ring or member 15, having a free surface 16 (which may be cylindrical) between the cone surfaces 14. The width of the surface 13 is preferably slightly greater than that of the surface 16, so that a space 17 will be left between said surfaces even where they come closest together; in other words, there will be no contact between the surfaces 13 and 16, but only between the cone surfaces 12 and 14. The diameter of the internal surfaces 14 is materially greater than that of the co-acting surfaces 12, so that they will have only a line contact with each other, at points lying substantially in the same plane with the axes of the two shafts 5 and 9, said plane being indicated by the line 18 in Fig. 1. The longitudinal pull of the elastic transmission member 8 will tend to keep said surfaces 12, 14 in contact at the points or lines mentioned, said member 8 being fitted into an external groove 19 of the ring 15. The cross section of the groove 19 is the same as that of the groove 7, and the two sides of the groove are preferably conical, and slightly convergent inwardly, or toward the axis of the member 6 or 15 respectively, thereby insuring slight wedging of the transmission member 8 in said grooves, and a good grip of the transmission member 8, thus guarding against its slipping circumferentially, on said members 6 and 15. These members 6 and 15 are preferably of the same diameter.

The members 11, 15 are in rolling contact with each other, and being arranged similarly to meshing internal gears, they will rotate normally at different speeds, the member 11 revolving faster than the member 15. This means for increasing the rotary speed of the spool 10 relatively to the member 6, takes up less room than the transmission means usually employed for a similar purpose in moving picture machines.

As the diameter of the coil of film wound on the spool 10 increases, the tendency would be to feed the film faster than it should move, and since the linear motion of the film, where it reaches the coil on said spool, is to be constant or approximately so, it follows that some circumferential slipping will generally occur where the members 11 and 15 are in engagement. The parts are preferably so dimensioned that there will be no such circumferential slipping when the film is just beginning to wind on the spool and there will be a gradually increasing slip as the film coil increases in diameter, with the effect of preserving a constant or approximately constant linear speed of the portion of the film at the periphery of the coil.

The outwardly-converging cone surfaces 14 serve as a means for properly positioning the member 15 on the member 11, and to prevent or minimize lateral or axial swaying of the member 15. It will be understood, however, that this member is floating, as it were, being free to yield slightly as the pull of the driving belt 8 may vary during the operation; this belt holds the member 15 in proper engagement with the member 11. The center about which the member 15 rotates may shift to different positions, owing to the floating character of said member. While I have devised this improved construction for use in moving picture machines, it will be obvious that it might be employed in other relations, as an instance of which I will refer to the type of station-indicators in which a strip of flexible material, traveling equal linear distances at each operation, is coiled on spools or the like.

Various modifications may be made without departing from the nature of my invention as set forth in the appended claims.

I claim:

1. A drive of the character described, comprising two wheels of different diameters arranged to rotate about parallel axes located at a constant distance from each other, a floating wheel having an internal runway in engagement with the periphery of the smaller one of the first-named wheels, and a longitudinally-elastic endless transmission member in engagement with the outer surfaces of the floating wheel and of the larger one of the first-named wheels.

2. A drive of the character described, comprising two wheels of different diameters arranged to rotate about parallel axes located at a constant distance from each other, a floating wheel arranged to run on the periphery of the smaller of the first-named wheels, and a longitudinally-elastic endless transmission member in engagement with said floating wheel and with the larger one of the first-named wheels.

3. A drive of the character described, comprising a driving wheel and a driven wheel arranged to rotate about parallel axes located at a constant distance from each other, said driven wheel having outwardly converging surfaces, a floating wheel having an internal runway of larger diameter than said driven wheel and eccentric thereto, said runway being provided with converging surfaces in frictional and rolling contact with those of said driven wheel, both the driving wheel and the floating wheel being provided with external annular grooves of like cross section and inwardly converging side surfaces, and an endless transmission member connecting said driving wheel with said floating wheel and wedged in the external grooves thereof.

In testimony whereof I have affixed my signature.

JOSEPH ROGER WHITE.